United States Patent
Tsirkin et al.

(10) Patent No.: US 9,477,509 B2
(45) Date of Patent: Oct. 25, 2016

(54) PROTECTION AGAINST INTERRUPTS IN VIRTUAL MACHINE FUNCTIONS

(71) Applicant: Red Hat Israel, Ltd., Ra'anana (IL)

(72) Inventors: Michael Tsirkin, Yokneam Illit (IL); Paolo Bonzini, Turate (IT)

(73) Assignee: Red Hat Israel, Ltd., Ra'Anana (IL)

( * ) Notice: Subject to any disclaimer, the term of this patent is extended or adjusted under 35 U.S.C. 154(b) by 96 days.

(21) Appl. No.: 14/604,003

(22) Filed: Jan. 23, 2015

(65) Prior Publication Data

US 2016/0216984 A1 Jul. 28, 2016

(51) Int. Cl.
G06F 9/455 (2006.01)
G06F 9/48 (2006.01)

(52) U.S. Cl.
CPC ......... *G06F 9/45558* (2013.01); *G06F 9/4812* (2013.01); *G06F 2009/45583* (2013.01)

(58) Field of Classification Search
CPC .................................................. G06F 9/4812
USPC ............................................................ 718/1
See application file for complete search history.

(56) References Cited

U.S. PATENT DOCUMENTS

| | | | |
|---|---|---|---|
| 8,234,432 B2 | 7/2012 | Serebrin | |
| 8,239,655 B2 | 8/2012 | Goggin | |
| 8,453,143 B2 | 5/2013 | Mahalingam et al. | |
| 8,719,817 B2 | 5/2014 | Aswani et al. | |
| 8,832,688 B2 | 9/2014 | Tang et al. | |
| 2007/0240157 A1* | 10/2007 | Herenyi .................. | G06F 9/485 718/1 |
| 2010/0125709 A1* | 5/2010 | Hall ...................... | G06F 12/1036 711/154 |
| 2013/0211545 A1* | 8/2013 | Jie ....................... | G05B 19/0421 700/4 |
| 2014/0013326 A1 | 1/2014 | Neiger et al. | |
| 2014/0137112 A1* | 5/2014 | Rigolet ............... | G06F 9/45558 718/1 |
| 2014/0173628 A1 | 6/2014 | Ramakrishnan Nair | |
| 2014/0283056 A1 | 9/2014 | Bachwani et al. | |

OTHER PUBLICATIONS

Mendel Rosenblum et al., "Virtual Machine Monitors: Current Technology and Future Trends", May 2005, IEEE Computer Society, pp. 39-47.*
Andrew Whitaker et al., "Denali: Lighweight Virtual Machines for Distributed and Networked Applications", 2002.*
Intel 64 and IA-32 Architectures Software Developers Manual, vol. 3C: System Programming Guide, Part 3, Sep. 2014 (540 pages).
Simple is Better, Thoughts on Hardware Virtualization Exception (#VE), May 18, 2014 (3 pages).

* cited by examiner

*Primary Examiner* — Lanny Ung
(74) *Attorney, Agent, or Firm* — K&L Gates LLP

(57) ABSTRACT

A system, methods, and apparatus for protection against interrupts in virtual machine functions are disclosed. A system includes memory, one or more physical processors, a virtual machine executing on the one or more physical processors, and a hypervisor executing on the one or more physical processors. The hypervisor determines a first location in the memory, corresponding to a physical address of the virtual machine function, and loads into memory at a second location in the memory outside the first location in the memory. The hypervisor initializes abort code at the second location in the memory. Prior to an execution of an instruction that loads an interrupt data structure on the virtual machine, a trap to the hypervisor is activated. The hypervisor then modifies a page table corresponding to the interrupt data structure to point to the initialized abort code.

20 Claims, 6 Drawing Sheets

Default Page Table 181

| 310A x0001 | 320A Read-Only | 330A x03FF |
|---|---|---|
| 310B x0002 | 320B Read-Write | 330B x040F |
| 310C x0003 | 320C Executable | 330C x041F |
| 310D x0004 | 320D Executable Only | 330D x042F |
| 310E x0005 | 330E Inaccessible | 330E x043F |

Alternate Page Table 182

| 340A x0001 | 350A Read-Write | 360A x01AF |
|---|---|---|
| 340B x0002 | 350B Read-Write | 360B VM Function x01FF |
| 340C x0003 | 350C Read-Write | 360C VM Function x024F |
| 340D x0004 | 350D Read-Write | 360D VM Function x029F |
| 340E x0005 | 350E Read-Write | 360E VM Function x02EF |
| 340F x0006 | 350F Read-Write | 360F x033F |

FIG. 3

Alternate Page View 420

- 440A Read-Write
- 440B VM Function Read-Write
- 440C VM Function Read-Write
- 440D VM Function Read-Write
- 440E VM Function Read-Write
- 440F Abort Code Read-Write

Default Page View 410

- 430A Read-Only
- 430B Read-Write
- 430C Executable
- 430D Executable Only
- 430E Inaccessible

FIG. 4

PROTECTION AGAINST INTERRUPTS IN VIRTUAL MACHINE FUNCTIONS

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as hypervisor, above the hardware and below the virtual machines. A hypervisor may run directly on the server hardware without an operating system beneath it or as an application running under a traditional operating system. A hypervisor may virtualize the physical layer and provide interfaces between the underlying hardware and virtual devices of virtual machines. Processor virtualization may be implemented by the hypervisor scheduling time slots on one or more physical processors for a virtual machine, rather than a virtual machine actually having a dedicated physical processor.

A virtualized computer system may provide routing and processing of interrupts. An interrupt generally refers to an event that requires a processor to execute event-specific instructions, which might involve the processor's holding the current thread of execution and/or switching contexts.

SUMMARY

The present disclosure provides a new and innovative system, methods and apparatus for protection against interrupts in virtual machine functions.

In an example embodiment, a system includes memory, one or more physical processors, a virtual machine executing on the one or more physical processors, and a hypervisor executing on the one or more physical processors. The hypervisor determines a first location in the memory, corresponding to a physical address of the virtual machine function and loads into memory at a second location in the memory outside the first location in the memory. The hypervisor then initializes code at the second location in the memory, wherein the code is configured to cause the virtual machine function to abort. Prior to an execution of an instruction that loads an interrupt data structure on the virtual machine, a trap to the hypervisor is activated. The hypervisor modifies a page table corresponding to the interrupt data structure to point to the initialized code.

Additional features and advantages of the disclosed method and apparatus are described in, and will be apparent from, the following Detailed Description and the Figures.

BRIEF DESCRIPTION OF THE FIGURES

FIG. 3 a block diagram of an example default page table and alternate page table according to an example embodiment of the present disclosure.

FIG. 4 is a block diagram of example page views and pages according to an example embodiment of the present disclosure.

DETAILED DESCRIPTION OF EXAMPLE EMBODIMENTS

Figure 1:
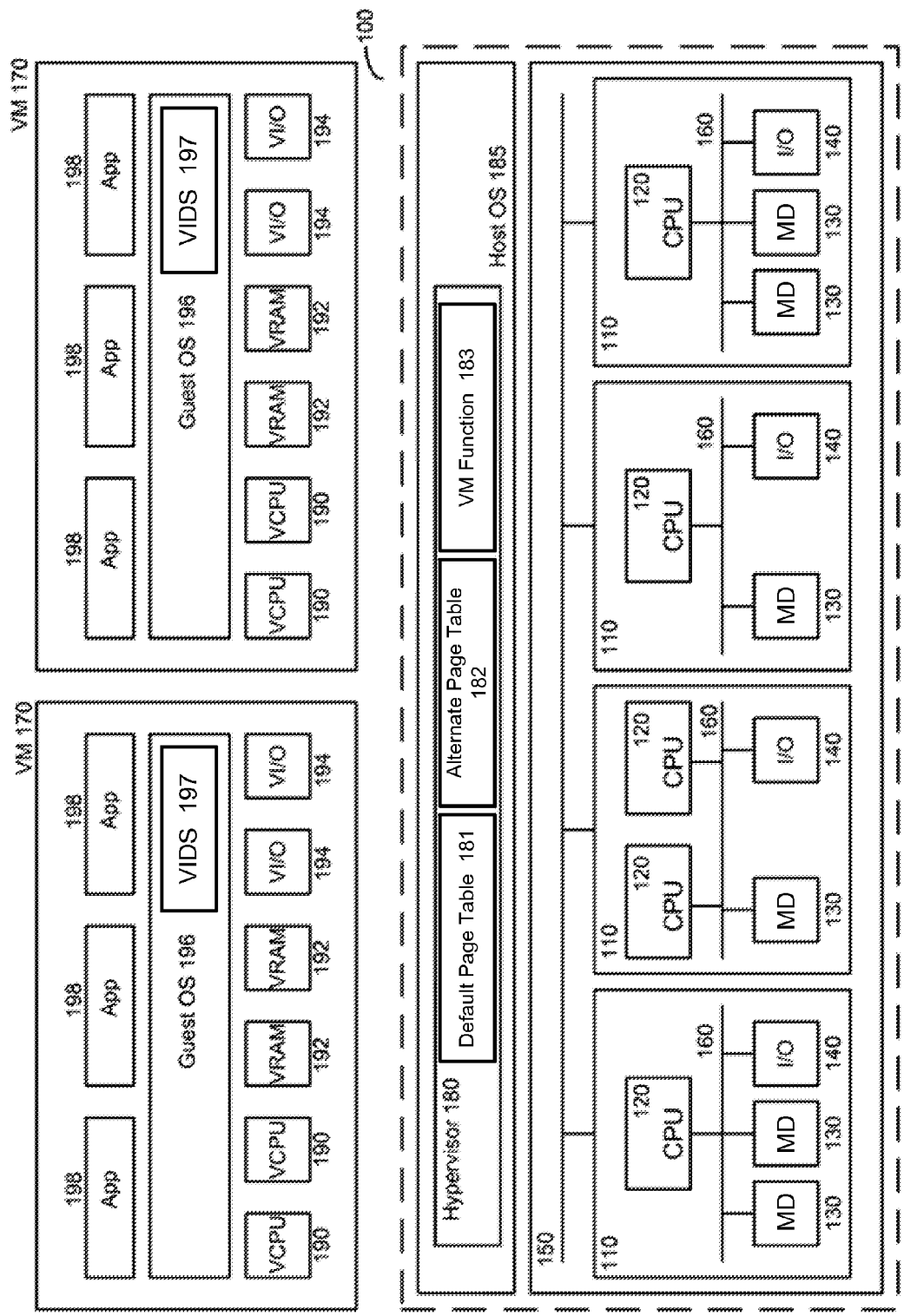
FIG. 1 is a block diagram of an example multiprocessor computer system according to an example embodiment of the present disclosure.

FIG. 1 depicts a high-level component diagram of an example multi-processor (or host) computer system 100 in accordance with one or more aspects of the present disclosure. The computer system 100 may include one or more interconnected nodes 110. Each node 110 may in turn include one or more physical processors 120 communicatively coupled to memory devices (MD) 130 and input/output (I/O) devices 140.

As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device refers to a volatile or non-volatile memory device, such as RAM, ROM, EEPROM, or any other device capable of storing data. As discussed herein, I/O device refers to a device capable of providing an interface between one or more processor pins and an external device capable of inputting and/or outputting binary data.

Processors 120 may be interconnected using a variety of techniques, ranging from a point-to-point processor interconnect, to a system area network 150, as shown in FIG. 1, such as an Ethernet-based network. Local connections within each node 110, including the connections between a processor 120 and a memory 130 and between a processor 120 and an I/O device 140 may be provided by one or more local buses 160 of suitable architecture, for example, peripheral component interconnect (PCI).

As noted above, computer system 100 may run multiple virtual machines 170, by executing a software layer (e.g., hypervisor 180) above the hardware and below the virtual machines, as schematically shown in FIG. 1. In one illustrative example, the hypervisor 180 may be a component of the operating system 185 executed by the computer system 100. Alternatively, the hypervisor 180 may be provided by an application running under the host operating system 185, or may run directly on the host computer system 100 without an operating system beneath it. The hypervisor 180 may virtualize the physical layer, including processors, memory, and I/O devices, and present this virtualization to virtual machines 170 as virtual devices, including virtual processors (VCPU) 190, virtual memory 192, and virtual I/O devices 194.

Figure 2:
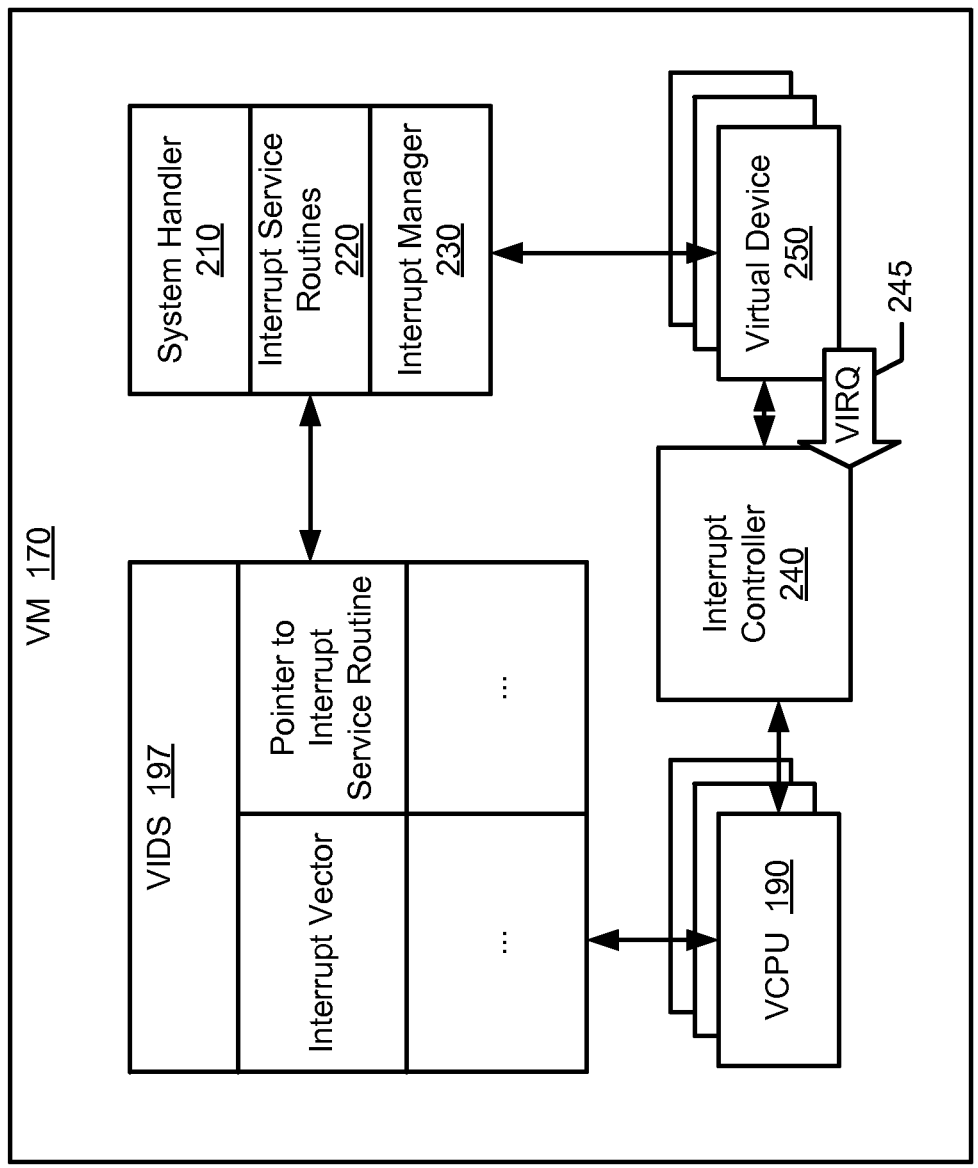
FIG. 2 is a block diagram of an example virtual machine including an interrupt data structure according to an example embodiment of the present disclosure.

A virtual machine 170 may execute a guest operating system 196 which may utilize the underlying virtual processors 190, virtual memory 192, and virtual I/O devices 194. One or more applications 198 may be running on a virtual machine 170 under the guest operating system 196. The guest operating system may include a virtual interrupt data structure (VIDS) 197. Example embodiments of the VIDS 197 are described in greater detail below and as shown in FIG. 2.

A virtual machine 170 may include multiple virtual processors (VCPU) 190. Processor virtualization may be implemented by the hypervisor 180 scheduling time slots on one or more physical processors 120 such that from the guest operating system's perspective those time slots are scheduled on a virtual processor 190.

The hypervisor 180 may provide one or more virtual machine functions (VM Functions 183) to a virtual machine 170. The code that a VM Function 183 runs on the physical processor(s) 120 may utilize the resources of host operating system (Host OS) 185, such as the memory devices 130, and the input/output devices 140 as well as the resources of one or more of the virtual machines 170 including the virtual processors 190, the virtual memory 192, and the virtual I/O devices 194. For example, the VM Function 183 may be called by a VM 170 to transfer data to, or access the resources of another VM 170. By contrast, each VM 170 may be limited to the use of its own resources including its VCPUs 190, virtual memory 192, and virtual I/O devices 194 unless it invokes a VM Function 183 as described below.

In an example embodiment, the VM Function 183 may be invoked for a VM 170, by the guest OS 196 that is running on it. In an example embodiment, a VM Function 183 may only be invoked if hypervisor 180 provides permission or grants a request. For example, a VM 170 or guest OS 196 may invoke a VM Function to handle a task more efficiently or using greater resources than are presently available to the VM 170 or guest OS 196. In an example embodiment, the hypervisor 180 may also deny the request by causing an undefined opcode exception or a general protection fault exception whenever the VM Function 183 is invoked.

The hypervisor may also include a default page table 181 and an alternate page table 182. Example embodiments of these data structures are described in greater detail below and as shown in FIG. 3.

FIG. 2 illustrates an example embodiment of a virtual machine 170. During operation, an event may be triggered by the operation of virtual device 250. The virtual device 250 can report the event by sending a virtual interrupt request (VIRQ 245) to one of the VCPUs 190 via an interrupt controller 240. The VIRQ 245 is sent with an interrupt vector that is assigned to the event. The VIRQ 245 is passed to a system handler 210, which consults a virtual interrupt data structure (VIDS) 197, using the interrupt vector as an index. The VIDS 197 associates each interrupt vector with an interrupt service routine 220. For example, the VIDS 197 is indexed by interrupt vectors, allowing the system handler 210 to use interrupt vectors to locate pointers to the corresponding interrupt service routines 220. The interrupt service routines 220 may then handle the event by causing the VCPU 190 to execute event handling code to perform appropriate operations.

The present disclosure is not limited to the structure of the system illustrated in FIG. 2. In an example embodiment, the virtual device 250 may be external to the VM 170 and/or the VIDS 197 may be stored externally to the VM 170. In another example embodiment, the system handler 210, interrupt service routines 220, and interrupt manager 230 may be on the hypervisor 180.

FIG. 3 illustrates a default page table 181 and an alternate page table 182 according to an example embodiment of the present disclosure. In general, the hypervisor 180 manages the memory usage of the VMs 170. Both virtual memory and physical memory may be divided into pages which are identified with a unique number (e.g., Page Frame Number (PFN) 310A-E or 340A-F). Example embodiments of pages and page views are described in greater detail below and as shown in FIG. 4.

A page table is a data structure used by the hypervisor 180 to store a mapping of physical addresses for the guest (e.g., used by the guest OS 196 on VM 170) to physical addresses for the host (e.g., used by the host hardware platform 100). Accordingly, address translation from guest-physical to host-physical memory addresses is handled using page tables. For example, each process or application operating within the VMs 170 may be given the impression that there is a contiguous section of memory available, when in reality, the available memory may be spread across various memory devices 130.

The page tables 181 and 182 comprise entries that map a virtual PFN 310A-E (or 340A-F) with a physical address 330A-E (or 360A-F). The page tables 181 and 182 may be used together with any paging data structure used by the VMs 170 to support translation from virtual to physical addresses (e.g., 32-bit linear address space using a two-level hierarchical paging structure, Physical Address Extension mode, INTEL Extended Memory 64 Technology mode, etc.).

In an example embodiment, page tables 181 and 182 may also include a protection identifier 320A-E (or 350A-F). The protection identifier 320A-E (or 350A-F) indicates the access protection status of a page for the page view described by the page table. A protection status may used to define for example that a given page is writable (or read-write), write-protected (or read-only), executable (or executable and readable), executable only, inaccessible (or non-present), etc. For example, in FIG. 3, the page associated with virtual PFN x0001 and memory location x03FF has been defined in default page table 181 as 'Read-Only'. The page associated with virtual PFN x0001 is associated with memory location x01AF in alternate page table 182 and has been defined as 'Read-Write'. The hypervisor 180 may be used to control to protection status of pages. In addition, in an example embodiment, the page tables 181 and 182 may include additional information not shown in FIG. 3 including statistics information, background information, dirty identifiers which indicate that modifications to a page must be written back to disk, etc.

In an example embodiment, one or more default page tables 181 may be maintained by the hypervisor 180 for each of the VMs 170 which maps virtual addresses to physical addresses that are accessible by each of the VMs 170. For example, the page table entries in the default page table 181 corresponding to the virtual PFNs (e.g. 310A-E) of an interrupt data structure (e.g., VIDS 197) on the VM 170 is accessed by physical CPU 120 when looking up pointers to interrupt service routines. The pointers to these interrupt service routines themselves provide a virtual PFN that is consulted in the default page table 181 to convert the pointers to physical addresses of the host computer system 100. In an example embodiment, in order to convert a virtual PFN to a host physical address, the hypervisor 180 may also consult page table 181, together with any paging data structure that the VMs 170 use to support translation from virtual to physical addresses. One or more alternate page tables 182 may be maintained by the hypervisor 180 for each of one or more VM Functions 183 which maps virtual addresses to physical addresses that are accessible by each of the VM Functions 183. For example, a portion of the entries in an alternate page table 182 (e.g., 360B-360E) may correspond to physical pages at which the VM Function 183 is located. In an example embodiment, one or more entries in alternate page table 182 may additionally be maintained by the hypervisor 180 for an interrupt data structure (e.g. VIDS 197) on the VM 170. As illustrated in FIG. 3, in an example embodiment, an alternate page table 182 may be more expansive than a default page table 181 in order to permit the VM Functions 183 to access a larger set of memory resources than the VMs 170 have access to. However, the sizes of different page tables may vary and that the degree of overlap between different page tables may vary (e.g., there may be no overlap).

FIG. 4 illustrates page views and pages, for example a default page view 410, an alternate page view 420, and pages 430A-E and 440A-F, in accordance with an example embodiment of the present disclosure. As noted above, a page may be a portion of physical or virtual memory designated for storing data. As used herein, a page view denotes a mapping from guest-physical addresses to host-physical addresses. For example, a default page view 410 is a page view that is referenced by a default page table 181. In an example embodiment, the default page view 410 may denote the mapping from virtual PFNs of a VM 170 to host-physical addresses, as used during normal execution of the virtual machine. An alternate page view 420 is a page view that is referenced by an alternate page table 182, as used during execution of the VM Function 183. In an example embodiment, the alternate page view 420 may denote a mapping from addresses designated for use by the VM Function 183 to host-physical addresses. In the illustrated example in FIG. 4, only a portion of pages on alternate page view 420 are designated for use by the VM Function 183 (e.g., 440B-E) and the remaining pages (e.g., 440A and 440F) refer to locations in the alternate page view 420 that are outside the memory location of the VM Function 183. As illustrated in FIG. 4, pages (e.g., 430A and 440A) may be defined by access protections (described above in more detail) such as 'Read-Only' or 'Read-Write' in accordance with their respective page table protection identifiers (e.g., 320A and 350A). A VM Function 183 may change the mapping of guest-physical addresses to host-physical addresses, e.g., page views 410 or 420, by changing the page tables 181 or 182 that the processor 120 uses to perform memory accesses in the VM 170.

Figure 5:
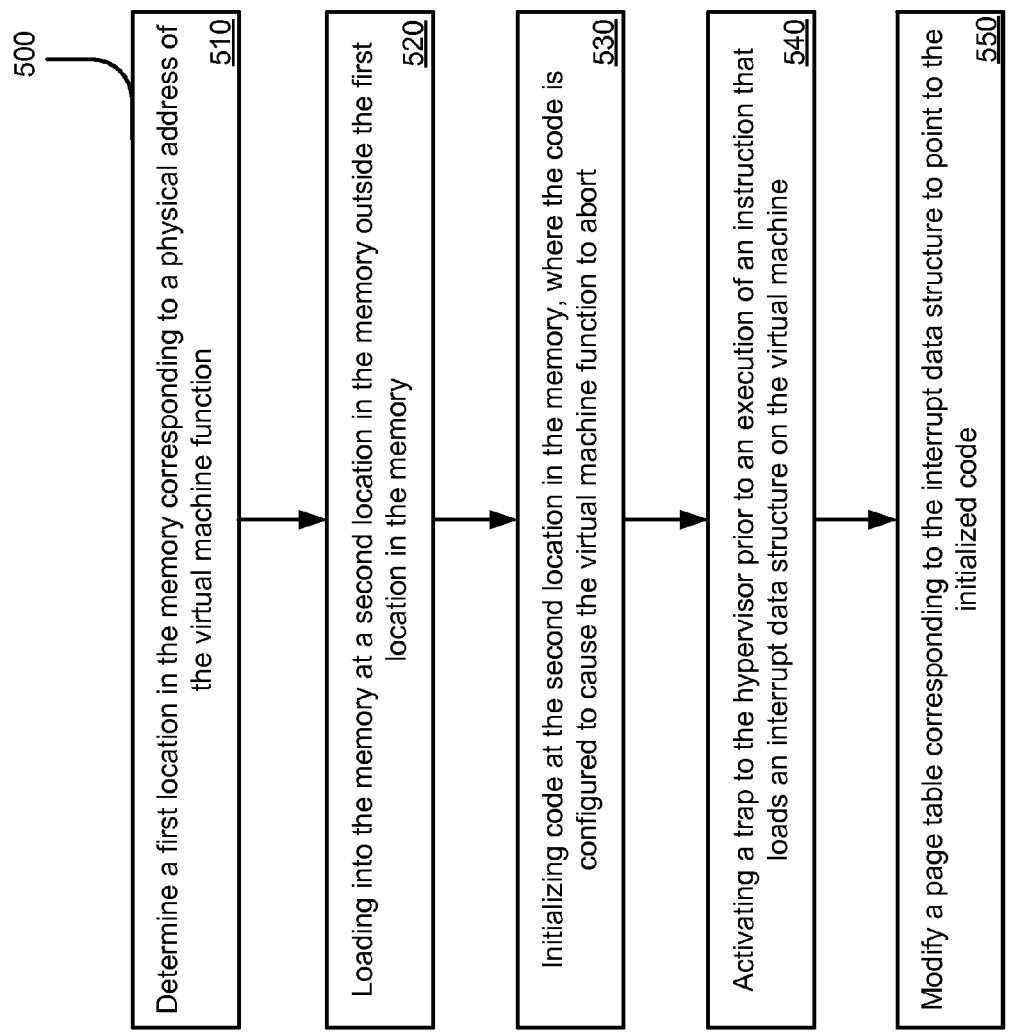
FIG. 5 is a flowchart illustrating an example process for protection against interrupts in virtual machine functions according to an example embodiment of the present disclosure

FIG. 5 illustrates a flowchart of an example method 500 for protection against interrupts in virtual machine functions. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software (such as is run on a general purpose computer system or a dedicated machine), or a combination of both. In an example embodiment, the method is performed by a hypervisor (e.g., hypervisor 180 of FIG. 1).

The example method 500 starts and the hypervisor 180 determines a first location in the memory, corresponding to a physical address of the virtual machine function 183 (block 510). In an example embodiment, the hypervisor 180 may determine the first location in the memory by reading a page table (e.g., alternate page table 182) entry from the guest page tables (e.g. a Physical Address Extension page table, or an INTEL Extended Memory 64 Technology page table). In another example embodiment, the hypervisor 180 may use a fixed location in memory.

Prior to this step, the hypervisor 180 may determine that a virtual machine function 183 or any associated resources are vulnerable to interrupts. In an example embodiment, the hypervisor 180 may undertake example method 500 when a VM 170 is initialized. In another example embodiment, the hypervisor 180 may undertake example method 500 responsive to determining that a guest OS 196 or VM 170 requires access to a VM Function 183 or its resources in an alternate view, for example on the first invocation of the VM Function 183. In yet another example, the hypervisor 180 may undertake example method 500 when it receives a request from guest OS 196 or VM 170 to access a VM Function 183. In an example embodiment, a page table corresponding to a virtual machine function 183 refers to a page table that includes at least one entry mapping addresses designated to the VM Function 183 to host physical addresses. In an example embodiment, a location in memory may refer to one address. In another example embodiment, a location in memory may refer to a block of addresses. In yet another example embodiment, a location in memory may refer to a multiple blocks of addresses that may be contiguous or may be dispersed across different areas of physical memory.

The hypervisor 180 loads into memory at a second location in the memory outside the first location in the memory (block 520). In an example embodiment, hypervisor 180 may load into a page (e.g., 440A or 440F) of an alternate page view 420 which includes VM Function 183 as illustrated in FIG. 4.

The hypervisor 180 initializes code at the second location in the memory, where the code is configured to cause the virtual machine function 183 to abort (block 530). In an example embodiment, hypervisor 180 may use a predefined offset to determine the second location in memory at which to load into and initialize code configured to cause the VM Function 183 to abort. For example, hypervisor 180 may use a predefined offset to load into a page (e.g., 440A or 440F) within the alternate page view 420 and initialize code therein configured to cause the virtual machine function 183 to abort. Page 440A and 440F are shown by way of example to be substantially immediately preceding and substantially immediately succeeding the pages corresponding to VM Function 183. The illustrated embodiment in FIG. 4 shows that the abort code has been initialized in page 440F. However, in other example embodiments the hypervisor 180 may load into memory and initialize the code at locations different from the illustrated embodiments.

In an example embodiment, the code configured to cause the virtual machine function 183 to abort may be code that causes the VM Function 183 to halt. In an example embodiment, the code configured to cause the virtual machine function 183 to abort may be code that causes the VM Function 183 to stop execution of a VCPU 190 and/or exit to the hypervisor 180. The hypervisor 180 may then execute instructions to return an error message to the VM 170 and/or execute the remaining code of the VM Function 183 on a physical CPU 120, and deliver an interrupt. The VCPU 190 may then restart execution using a default page view 410.

In another example embodiment, the code configured to cause the virtual machine function 183 to abort may be code that causes the VM Function 183 to return prior to completing one or more tasks. In yet another example embodiment, the virtual machine function 183 may be caused to abort by modifying one or more permissions of the page table (e.g., alternate page table 182) corresponding to VIDS 197. For example, the code may modify one or more protection identifiers (e.g., 350B-E) corresponding to entries of a page table (e.g., alternate page table 182) associated with the VIDS 197 to render the corresponding pages non-readable.

Furthermore, while example embodiments of the present disclosure are described in terms of loading into and initializing code outside the location in memory of the VM Function 183, the hypervisor 180 may load into the memory location of the VM Function 183 itself and modify the VM Function 183 to include code that does not start execution of the VM Function 183 and immediately returns to default page view 410.

The hypervisor 180 activates a trap to the hypervisor 180 prior to an execution of an instruction that loads an interrupt data structure 197 on a virtual machine 170 (block 540). For example, prior to a guest OS 196 executing an instruction that loads VIDS 197 on VM 170, the hypervisor 180 may activate a trap. Activating a trap to hypervisor 180 for a particular instruction in this manner can be used to cause the hypervisor 180 to emulate the execution of guest instructions on the code and processors of the hypervisor 180 itself. In another example, activating a trap to the hypervisor 180 may be used by the hypervisor 180 to determine the virtual PFN (e.g. 310A-E or 340A-F) that corresponds to the interrupt data structure (e.g., VIDS 197). For example, when the guest OS 196 executes an instruction that loads VIDS 197 on VM 170, the prior activated trap may cause a descriptor exit to the hypervisor 180 that allows the hypervisor to determine the location of the page table that corresponds to the interrupt data structure 197. The use of descriptor exiting is merely an example, and there are many other ways to activate a trap to the hypervisor in accordance with the present disclosure. In an example embodiment, activating a trap may include requesting that a processor 120 enable a trap to the hypervisor 180 such that responsive to the guest OS 196 executing an instruction, the enabled (i.e. activated) trap causes the hypervisor 180 to emulate running the guest OS 196.

The hypervisor 180 then modifies a page table (e.g., alternate page table 182) corresponding to the interrupt data structure 197 to point to the initialized code (block 550). In an example embodiment, the hypervisor 180 may modify a page table (e.g., alternate page table 182) responsive to determining the virtual PFN (e.g. 310A-E or 340A-F) that corresponds to the interrupt data structure 197, as described in greater detail above. In an example embodiment, a page table (e.g., default page table 181) corresponding to an interrupt data structure 197 refers to a page table (e.g., default page table 181) that includes at least one entry mapping addresses accessible by the interrupt data structure 197 to host physical addresses.

In an example embodiment, hypervisor 180 may modify an entry in the page table (e.g., alternate page table 182) corresponding to the interrupt data structure 197 by initializing one or more physical pages (e.g., 430A-E) corresponding to the interrupt data structure 197 such that when interpreted as an interrupt data structure 197, the pointer causes a jump to an offset within a page matching the initialized code. In this example, modifying an entry in the page table (e.g., default page table 181) corresponding to the interrupt data structure 197 may include switching from a default view (e.g., default view 410) to an alternate view (e.g., alternate view 420). Specifically, the hypervisor 180 may switch the active page table for the interrupt data structure 197 from a default page table 181 corresponding to the interrupt data structure 197 to an alternate page table 182 corresponding to the interrupt data structure 197. This advantageously permits an interrupt 245 to the interrupt descriptor table 197 to cause a jump to the initialized abort code without modifying the default page table 181 associated with VM 170.

In an example embodiment, the hypervisor 180 may modify an entry in a page table (e.g., alternate page table 182) corresponding to the interrupt data structure 197 so that at least one entry of the page table (e.g., alternate page table 182) that corresponds to an address on the interrupt data structure 197 is modified to point to the initialized abort code. In another example embodiment, the hypervisor 180 may modify an entry in the page table (e.g., alternate page table 182) corresponding to the interrupt data structure 197 so that all entries of the page table (e.g., alternate page table 182) that correspond to addresses on the interrupt data structure 197 are modified to point to the initialized abort code. In this manner, all types of interrupts 245 that may be received at VM 170 will cause a jump to the initialized abort code rather than to an interrupt service routine 220.

Aborting a VM Function 183 as described in the present disclosure, significantly limits the access to virtual and physical resources of a computer system by the source of an interrupt (e.g., a VM 170, guest OS 196, application 198, physical or virtual devices, malicious code, etc.) through the use of an interrupt data structure 197. Moreover, injecting interrupts via a virtual machine while a virtual machine function is executing may cause one or more VMs, host OS's, or guest OS's to crash, for example, if the interrupt data structure 197 points to code in memory that adversely affects execution of code for VM Function 183, or accesses resources that are not available in a default page view 410, but which are available in an alternate page view 420. The present disclosure advantageously protects a computer system 100 from the above described problems. Furthermore, the present disclosure advantageously permits the VM Function 183 to operate normally unless an interrupt is received through VM 170 during execution of the VM Function 183. Moreover, through the use of alternate views 420 described by alternate page tables 182, the present disclosure permits integrity of the interrupt data structures 197 on the VMs 170 and allows the guest OS 196 and VM 170 continued control over its own interrupt data structure 197 and default page table 181.

Figure 6:
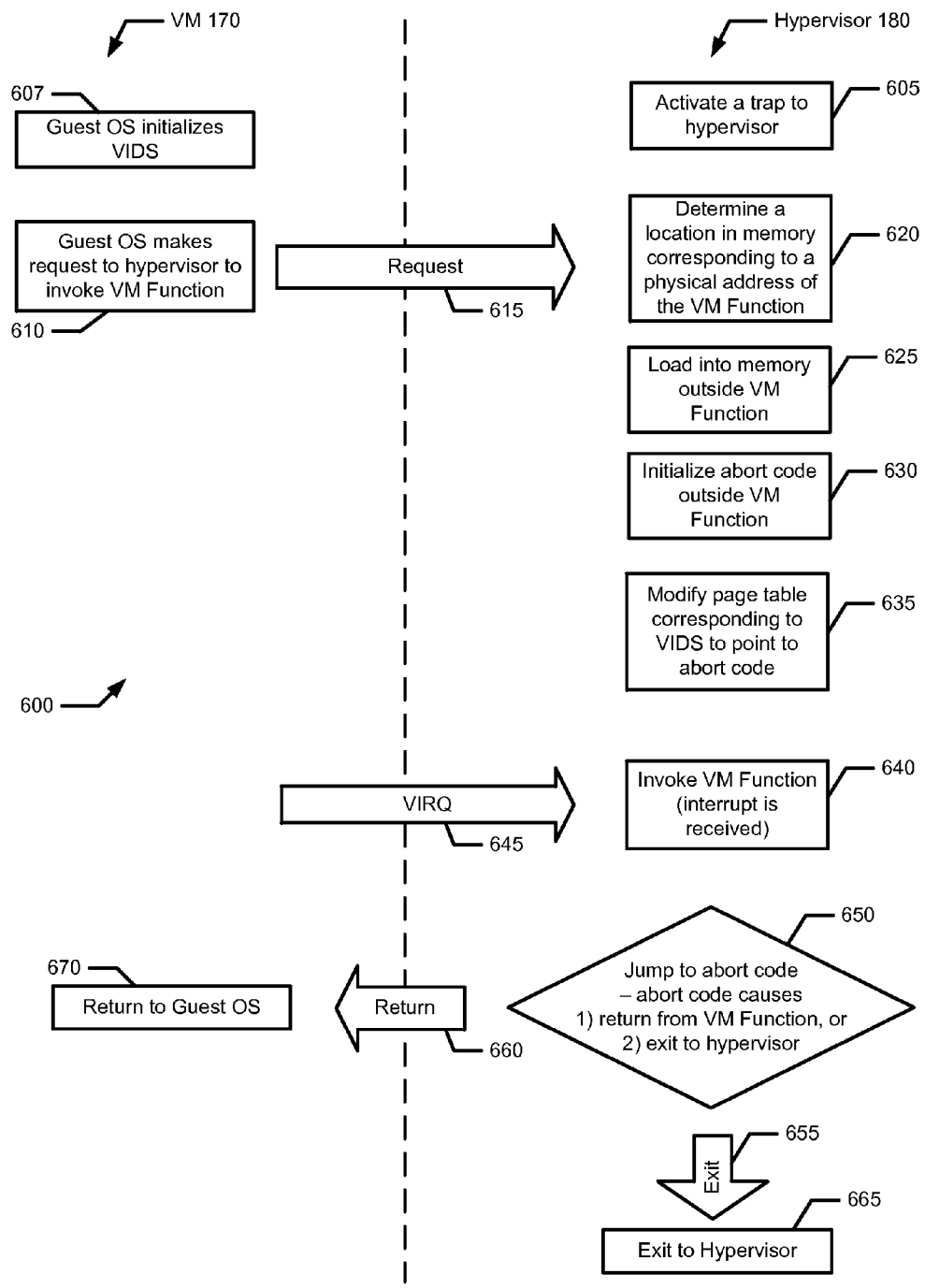
FIG. 6 is a flow diagram illustrating a guest operating system and hypervisor according to an example embodiment of the present disclosure.

FIG. 6 illustrates a flow diagram of an example process 600 including a VM 170 and hypervisor 180 in accordance with an example embodiment of the present disclosure. In the illustrated example embodiment, the hypervisor 180 activates a trap to the hypervisor 180 prior to the execution of an instruction that loads an interrupt data structure 197 on a virtual machine 170 (block 605). In another example embodiment, the hypervisor 180 may activate a trap to the hypervisor 180 at any time as long as it is prior to the execution of an instruction that loads an interrupt data structure 197 on a virtual machine 170 (not shown). The guest OS 196 or VM 170 loads a VIDS 197 on the VM 170 (block 607). In an example embodiment, responsive to loading the VIDS 197 on VM 170, the activated trap may cause a descriptor exit to the hypervisor 180 and the hypervisor may determine the address of the page table that corresponds to the VIDS 197 (not shown). The guest OS 196 or VM 170 sends a request to the hypervisor 180 to invoke a virtual machine function 183 (block 610). This request is transmitted to the hypervisor 180 (block 615). Responsive to receiving the request 615, the hypervisor 180 determines a location in memory corresponding to a physical address of the VM Function 183 that was referenced in the request 615 (block 620). In another embodiment, no request is sent to the hypervisor 180 by the guest OS 196 or VM 170 and the hypervisor 180 may determine the location of the VM Function 183 by reading a page table (e.g., alternate page table 182) corresponding to the VM Function 183 and (not shown). The hypervisor 180 loads into memory at a location outside the location in memory of the VM Function 183 (block 625). The hypervisor 180 then initializes abort code at a location in memory (e.g., 440A or 440F) outside the VM Function (block 630). The hypervisor 180 modifies a page table (e.g., default page table 181) corresponding to VIDS 197 to point to the initialized abort code (block 635). The hypervisor 180 invokes the VM Function 183 (block 640). An interrupt is received at VM 170 (block 645). In an example embodiment, the interrupt is received during the execution of the VM Function 183, and before the VM Function 183 completes execution. The received interrupt causes a jump to the initialized abort code (block 650). In an example embodiment, the initialized code executes instructions to cause the VM Function 183 to abort in any one of a number of ways including a return from the VM Function 183 and an exit to the hypervisor 180. For example, the initialized code may cause a return (block 660) to guest OS 196 (block 670). In another example, the initialized code may cause an exit (block 655) to the hypervisor 180 (block 665). In an example embodiment, after an exit to the hypervisor 180 occurs, the hypervisor 180 may execute a variety of instructions including instructions to cause a return to the guest OS 196 or VM 170. In another example embodiment, no interrupt is received at VM 170 and no jump to the abort code occurs (not shown).

In an example embodiment, the hypervisor 180 may modify the page table corresponding to the interrupt data structure 197 again to revert to its earlier form, which was initialized by the guest OS 196 or VM 170. In an example embodiment, the hypervisor may cause the page table corresponding to the interrupt data structure 197 to revert to its earlier form once the VM Function 183 completes executing and returns. In an example embodiment, the hypervisor may cause the page table corresponding to the interrupt data structure 197 to revert to its earlier form once the abort code completes executing and returns.

In an example embodiment, the hypervisor 180 reverts the page table corresponding to the interrupt data structure 197 to its earlier form by switching from an alternate view back to a default view. Specifically, the hypervisor 180 may switch the active page table for the interrupt data structure 197 from an alternate page table corresponding to the interrupt data structure 197 back to a default page table 181 corresponding to the interrupt data structure 197.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first exemplary aspect of the present disclosure, a system comprises a memory, one or more processors coupled to the memory, a virtual machine executing on the one or more processors, and a hypervisor executing on the one or more processors to determine a first location in the memory, corresponding to a physical address of a virtual machine function, load into the memory at a second location in the memory outside the first location in the memory, initialize code at the second location in the memory, wherein the code is configured to cause the virtual machine function to abort, activate a trap to the hypervisor prior to an execution of an instruction that loads an interrupt data structure on the virtual machine, and modify a page table corresponding to the interrupt data structure to point to the initialized code. In accordance with another exemplary aspect of the present disclosure, which may be used in combination with the first aspect, the code that is configured to cause the virtual machine function to abort comprises code configured to cause an exit to the hypervisor. In accordance with another exemplary aspect of the present disclosure, which may be used in combination with any one or more of the preceding aspects, the code that is configured to cause the virtual machine function to abort comprises code configured to cause a virtual machine function return. In accordance with another exemplary aspect of the present disclosure, which may be used in combination with any one or more of the preceding aspects, the code that is configured to cause the virtual machine function to abort comprises code configured to modify a permission of the page table corresponding to the interrupt data structure. In accordance with another exemplary aspect of the present disclosure, which may be used in combination with any one or more of the preceding aspects, modifying the permission comprises rendering a page inaccessible. In accordance with another exemplary aspect of the present disclosure, which may be used in combination with any one or more of the preceding aspects, responsive to the execution of the instruction that loads the interrupt data structure on the virtual machine, causing, by the trap to the hypervisor, a descriptor exit. In accordance with another exemplary aspect of the present disclosure, which may be used in combination with any one or more of the preceding aspects, determining, by the hypervisor, a third location in the memory of the page table corresponding to the interrupt data structure. In accordance with another exemplary aspect of the present disclosure, which may be used in combination with any one or more of the preceding aspects, the second location in the memory comprises a location substantially immediately preceding the code of the virtual machine function. In accordance with another exemplary aspect of the present disclosure, which may be used in combination with any one or more of the preceding aspects, the second location in the memory comprises a location substantially immediately succeeding the code of the virtual machine function. In accordance with another exemplary aspect of the present disclosure, which may be used in combination with any one or more of the preceding aspects, modifying the page table corresponding to the interrupt data structure comprises switching from a default page table to an alternate page table associated with the interrupt data structure. In accordance with another exemplary aspect of the present disclosure, which may be used in combination with any one or more of the preceding aspects, receiving an interrupt on the virtual machine, and jumping to the initialized code. In accordance with another exemplary aspect of the present disclosure, which may be used in combination with any one or more of the preceding aspects, reverting the page table corresponding to the interrupt data structure to an earlier form. In accordance with another exemplary aspect of the present disclosure, which may be used in combination with any one or more of the preceding aspects, determining the first location in the memory includes reading a page table corresponding to the virtual machine function.

In a second exemplary aspect of the present disclosure, a method comprises determining, by a hypervisor executing on a computer system, a first location in memory, corresponding to a physical address of a virtual machine function, loading, by the hypervisor, into the memory at a second location in the memory outside the first location in the memory, initializing, by the hypervisor, code at the second location in the memory, wherein the code is configured to cause the virtual machine function to abort, activating, by the hypervisor, a trap to the hypervisor prior to an execution of an instruction that loads an interrupt data structure on a virtual machine, and modifying, by the hypervisor, a page table corresponding to the interrupt data structure to point to the initialized code. In accordance with another exemplary aspect of the present disclosure, which may be used in combination with any one or more of the preceding aspects, the code that is configured to cause the virtual machine function to abort comprises code configured to cause an exit to the hypervisor. In accordance with another exemplary aspect of the present disclosure, which may be used in combination with any one or more of the preceding aspects, the code that is configured to cause the virtual machine function to abort comprises code configured to cause a virtual machine function return. In accordance with another exemplary aspect of the present disclosure, which may be used in combination with any one or more of the preceding aspects, the code that is configured to cause the virtual machine function to abort comprises code configured to modify a permission of the page table corresponding to the interrupt data structure. In accordance with another exemplary aspect of the present disclosure, which may be used in combination with any one or more of the preceding aspects, modifying the permission comprises rendering a page inaccessible. In accordance with another exemplary aspect of the present disclosure, which may be used in combination with any one or more of the preceding aspects, responsive to the execution of the instruction that loads the interrupt data structure on the virtual machine, causing, by the trap to the hypervisor, a descriptor exit. In accordance with another exemplary aspect of the present disclosure, which may be used in combination with any one or more of the preceding aspects, determining, by the hypervisor, a third location in the memory of the page table corresponding to the interrupt data structure. In accordance with another exemplary aspect of the present disclosure, which may be used in combination with any one or more of the preceding aspects, the second location in the memory comprises a location substantially immediately preceding the code of the virtual machine function. In accordance with another exemplary aspect of the present disclosure, which may be used in combination with any one or more of the preceding aspects, the second location in the memory comprises a location substantially immediately succeeding the code of the virtual machine function. In accordance with another exemplary aspect of the present disclosure, which may be used in combination with any one or more of the preceding aspects, modifying the page table corresponding to the interrupt data structure comprises switching from a default page table to an alternate page table associated with the interrupt data structure. In accordance with another exemplary aspect of the present disclosure, which may be used in combination with any one or more of the preceding aspects, receiving an interrupt on the virtual machine, and jumping to the initialized code. In accordance with another exemplary aspect of the present disclosure, which may be used in combination with any one or more of the preceding aspects, reverting the page table corresponding to the interrupt data structure to an earlier form. In accordance with another exemplary aspect of the present disclosure, which may be used in combination with any one or more of the preceding aspects, determining the first location in the memory includes reading a page table corresponding to the virtual machine function.

In a third exemplary aspect of the present disclosure, a computer-readable non-transitory storage medium comprises executable instructions that, when executed by a computer system, cause the computer system to determine, by a hypervisor executing on a computer system, a first location in memory, corresponding to a physical address of a virtual machine function, load, by the hypervisor, into the memory at a second location in the memory outside the first location in the memory, initialize, by the hypervisor, code at the second location in the memory, wherein the code is configured to cause the virtual machine function to abort, activate, by the hypervisor, a trap to the hypervisor prior to an execution of an instruction that loads an interrupt data structure on a virtual machine, and modify, by the hypervisor, a page table corresponding to the interrupt data structure to point to the initialized code. In accordance with another exemplary aspect of the present disclosure, which may be used in combination with any one or more of the preceding aspects, the code that is configured to cause the virtual machine function to abort comprises code configured to cause an exit to the hypervisor. In accordance with another exemplary aspect of the present disclosure, which may be used in combination with any one or more of the preceding aspects, the code that is configured to cause the virtual machine function to abort comprises code configured to cause a virtual machine function return. In accordance with another exemplary aspect of the present disclosure, which may be used in combination with any one or more of the preceding aspects, the code that is configured to cause the virtual machine function to abort comprises code configured to modify a permission of the page table corresponding to the interrupt data structure. In accordance with another exemplary aspect of the present disclosure, which may be used in combination with any one or more of the preceding aspects, modifying the permission comprises rendering a page inaccessible. In accordance with another exemplary aspect of the present disclosure, which may be used in combination with any one or more of the preceding aspects, responsive to the execution of the instruction that loads the interrupt data structure on the virtual machine, causing, by the trap to the hypervisor, a descriptor exit. In accordance with another exemplary aspect of the present disclosure, which may be used in combination with any one or more of the preceding aspects, determining, by the hypervisor, a third location in the memory of the page table corresponding to the interrupt data structure. In accordance with another exemplary aspect of the present disclosure, which may be used in combination with any one or more of the preceding aspects, the second location in the memory comprises a location substantially immediately preceding the code of the virtual machine function. In accordance with another exemplary aspect of the present disclosure, which may be used in combination with any one or more of the preceding aspects, the second location in the memory comprises a location substantially immediately succeeding the code of the virtual machine function. In accordance with another exemplary aspect of the present disclosure, which may be used in combination with any one or more of the preceding aspects, modifying the page table corresponding to the interrupt data structure comprises switching from a default page table to an alternate page table associated with the interrupt data structure. In accordance with another exemplary aspect of the present disclosure, which may be used in combination with any one or more of the preceding aspects, receiving an interrupt on the virtual machine, and jumping to the initialized code. In accordance with another exemplary aspect of the present disclosure, which may be used in combination with any one or more of the preceding aspects, reverting the page table corresponding to the interrupt data structure to an earlier form. In accordance with another exemplary aspect of the present disclosure, which may be used in combination with any one or more of the preceding aspects, determining the first location in the memory includes reading a page table corresponding to the virtual machine function.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
    a memory;
    one or more processors, coupled to the memory;
    a virtual machine executing on the one or more processors; and
    a hypervisor executing on the one or more processors to:
        determine a first location in the memory, corresponding to a physical address of a virtual machine function;
        load into the memory at a second location in the memory outside the first location in the memory;
        initialize code at the second location in the memory, wherein the code is configured to cause the virtual machine function to abort;
        activate a trap to the hypervisor prior to an execution of an instruction that loads an interrupt data structure on the virtual machine; and
        modify a page table corresponding to the interrupt data structure to point to the initialized code.

2. The system of claim 1, wherein the code that is configured to cause the virtual machine function to abort comprises code configured to cause an exit to the hypervisor.

3. The system of claim 1, wherein the code that is configured to cause the virtual machine function to abort comprises code configured to cause a virtual machine function return.

4. The system of claim 1, wherein the code that is configured to cause the virtual machine function to abort comprises code configured to modify a permission of the page table corresponding to the interrupt data structure.

5. The system of claim 4, wherein modifying the permission comprises rendering a page inaccessible.

6. The system of claim 1, further comprising responsive to the execution of the instruction that loads the interrupt data structure on the virtual machine, causing, by the trap to the hypervisor, a descriptor exit.

7. The system of claim 6, further comprising determining, by the hypervisor, a third location in the memory of the page table corresponding to the interrupt data structure.

8. The system of claim 1, wherein the second location in the memory comprises a location substantially immediately preceding the code of the virtual machine function.

9. The system of claim 1, wherein the second location in the memory comprises a location substantially immediately succeeding the code of the virtual machine function.

10. The system of claim 1, wherein modifying the page table corresponding to the interrupt data structure comprises switching from a default page table to an alternate page table associated with the interrupt data structure.

11. The system of claim 1, wherein modifying the page table corresponding to the interrupt data structure comprises modifying every entry of the page table that corresponds to addresses of interrupt service routines on the interrupt data structure.

12. The system of claim 1, further comprising receiving an interrupt on the virtual machine, and jumping to the initialized code.

13. The system of claim 12, further comprising reverting the page table corresponding to the interrupt data structure to an earlier form.

14. The system of claim 1, wherein determining the first location in the memory includes reading a page table corresponding to the virtual machine function.

15. A method, comprising:
    determining, by a hypervisor executing on a computer system, a first location in memory, corresponding to a physical address of a virtual machine function;
    loading, by the hypervisor, into the memory at a second location in the memory outside the first location in the memory;
    initializing, by the hypervisor, code at the second location in the memory, wherein the code is configured to cause the virtual machine function to abort;
    activating, by the hypervisor, a trap to the hypervisor prior to an execution of an instruction that loads an interrupt data structure on a virtual machine; and
    modifying, by the hypervisor, a page table corresponding to the interrupt data structure to point to the initialized code.

16. The method of claim 14, wherein modifying the page table corresponding to the interrupt data structure comprises switching from a default page table to an alternate page table associated with the interrupt data structure.

17. The method of claim 14, further comprising receiving an interrupt on the virtual machine, and jumping to the initialized code.

18. A computer-readable non-transitory storage medium comprising executable instructions that, when executed by a computer system, cause the computer system to:
    determine, by a hypervisor executing on a computer system, a first location in memory, corresponding to a physical address of a virtual machine function;
    load, by the hypervisor, into the memory at a second location in the memory outside the first location in the memory;

initialize, by the hypervisor, code at the second location in the memory, wherein the code is configured to cause the virtual machine function to abort;

activate, by the hypervisor, a trap to the hypervisor prior to an execution of an instruction that loads an interrupt data structure on a virtual machine;

modify, by the hypervisor, a page table corresponding to the interrupt data structure to point to the initialized code.

19. The computer-readable non-transitory storage medium of claim 18, wherein modifying the page table corresponding to the interrupt data structure comprises switching from a default page table to an alternate page table associated with the interrupt data structure.

20. The computer-readable non-transitory storage medium of claim 18, further comprising receiving an interrupt on the virtual machine, and jumping to the initialized code.

* * * * *